June 24, 1969     M. BURES ET AL     3,451,753

PHOTOGRAPHIC PROJECTION PRINTER

Filed April 26, 1967

INVENTORS
Miroslav Bureš, František Bouchal
BY
Richard [signature]
Ag't

United States Patent Office 3,451,753
Patented June 24, 1969

3,451,753
PHOTOGRAPHIC PROJECTION PRINTER
Miroslav Bures and Frantisek Bouchal, Prerov, Czechoslovakia, assignors to Meopta, národní podnik, Prerov, Czechoslovakia
Filed Apr. 26, 1967, Ser. No. 633,818
Claims priority, application Czechoslovakia, May 6, 1966, 3,056/66
Int. Cl. G03b 27/32, 27/54
U.S. Cl. 355—67                7 Claims

ABSTRACT OF THE DISCLOSURE

A projection printer or enlarger whose head can be pivoted about a horizontal axis for horizontal or vertical projection, and whose lamp housing is rotatable on the head about a horizontal axis perpendicular to the optical axis of the objective. A linkage connects the lamp housing to the fixed support structure of the enlarger to rotate the lamp housing on the head when the latter is pivoted so that the lamp in the housing maintains its proper vertical position.

Background of the invention

This invention relates to photographic projection printers or enlargers, and particularly to an improved lighting system for an enlarger whose head may be pivoted for vertical or horizontal projection.

The heads of many enlargers can be pivoted on the supporting structure between positions in which the optical axis of the enlarger lens is vertical and horizontal respectively. Horizontal projection is usually resorted to when the vertical distance between the head and the paper board of the enlarger is not sufficient for a desired degree of enlargement.

The electrical high-intensity lamps employed in modern enlargers are designed for optimum performance in a specific position relative to a vertical line. When they are tilted, their useful life is shortened and their light output may also be impaired.

It has therefore been proposed heretofore to install the lamp in a separate lamp housing fixedly mounted on the stationary supporting structure, to pivot the enlarger head about the beam of the lamp, and to deflect the beam of the lamp at right angles by a mirror into the optical axis of the objective lens on the enlarger head. In such an arrangement, the enlarger head is necessarily supported at one end remote from its center of gravity and tends to swing toward a position in which the center of gravity is below the pivot axis. Stresses in the enlarger are unfavorably distributed so that the stationary elements and the head must be made stronger and heavier than is necessary in the normal arrangement of pivoting the head about an axis closely adjacent the center of gravity.

An important object of this invention is the provision of a projection printer or enlarger whose head is pivoted on the supporting structure about an axis close to the center of gravity, and whose lamp carrier maintains a fixed angular position relative to a vertical line during pivoting of the head.

Summary of the invention

The improved lighting system of the invention includes a lamp carrier which is mounted on the head of the projection apparatus for rotation about a normally horizontal pivot axis, the lamp carrier being adapted to hold an electric lamp. Means are provided for deflecting the light of a lamp held by the carrier into the optical axis of the objective lens on the head. A linkage which connects the lamp carrier to the stationary support of the apparatus rotates the carrier on the head in response to angular movement of the head on the support so that a substantially fixed angular position of the lamp holder relative to a normally vertical line is maintained.

The exact nature of this invention as well as other objects and advantages thereof will be readily apparent from consideration of the following specification relating to the annexed drawing.

Description of the preferred embodiment

Figure 1:
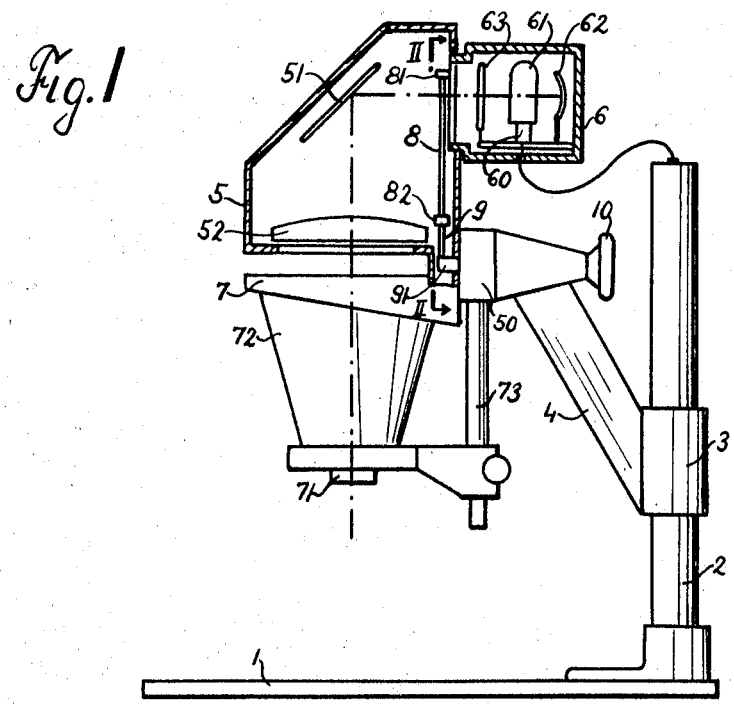
FIG. 1 shows an enlarger of the invention in side-elevational partly sectional view.

Referring initially to FIG. 1, the illustrated enlarger has a paper board 1 on which an upright column 2 is fixedly mounted. A sleeve 3 is longitudinally slidable on the column 2 and may be fastened to the column at any desired height as is conventional, but not shown in the drawing. A bracket 4 integral with the sleeve 3 supports the enlarger head 5.

The base 50 of the head 5 pivots on a pin 91 fixedly mounted on the bracket 4, and may be clamped to the bracket 4 in any desired angular position by turning a knob 10. A negative holder portion 7 of the head 5 is provided with a slot in which a negative to be enlarged or other transparency to be projected may be inserted by means of a suitable frame, not shown. Bellows 72 connect the negative holder portion 7 with a lens mount 71 which normally receives one of several interchangeable objective lenses. The lens mount 71 is supported on a rod 73 fixedly fastened to the base 50, and may be shifted along the rod in the direction of the optical axis of the objective lens. The structure described so far is conventional.

A lamp housing 6 is rotatably sealed to a wall of the head 5 which is vertical in the position of the head 5 shown in FIG. 1 in which the optical axis of an objective in the mount 7 is vertically directed toward the paper board 1. A lamp socket 60 in the housing 6 carries an electric projection lamp 61 which is arranged between a curved reflector 62 and a filter 63 of heat absorbing glass. The light beam of the lamp 61 is reflected in the enlarger head 5 by a mirror 51 into the optical axis of the objective lens, and passes sequentially through a condenser lens 52, the slot or a negative held therein, and an objective lens in the mount 7.

Figure 2:
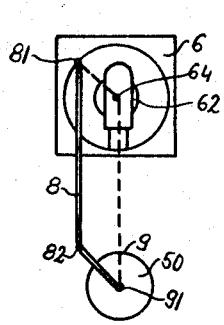
FIG. 2 shows a portion of the enlarger of FIG. 1 in front elevation on the line II—II.
Figure 3:
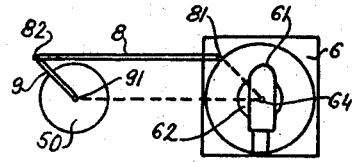
FIG. 3 shows the device of FIG. 2 in a different operating position.

The lamp housing 6 is connected to the stationary bracket 4 by a parallelogram linkage which includes a radial arm 9 fixedly attached to the pin 91 and a link 8, which is hingedly connected to the free end of the arm 9 by a pivot pin 82 and to the housing 6 by a pivot pin 81, as is better seen in FIG. 2. The effective length of the link 8 is equal to the spacing of the point light source in the lamp 61 from the axis of the pin 91, and the length of the arm 9 is equal to the spacing of the light source from the pivot pin 81. The spacings are indicated in FIG. 2 by broken lines. The filter 63 has been omitted from FIG. 2 for the sake of clarity.

When the enlarger head 5 is swung about the pin 91 in a clockwise direction, as viewed in FIG. 2, for horizontally projecting an image, the lamp housing travels through an arc of 90°, and is simultaneously rotated by the parallelogram linkage on the enlarger head 5 through an angle of 90° so that the angular position of the housing 6, of the socket 60, and of the lamp 61 relative to a vertical line remains unchanged. The lamp 61 remains upright in all angular positions of the head 5.

Figure 4:
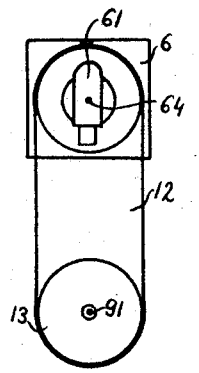
FIG. 4 illustrates a modification of the device as shown in FIG. 2.

While a parallelogram linkage connecting the lamp carrying elements and the stationary supporting elements is particularly simple and convenient, other linkages producing the same effect will readily be devised by those skilled in the art. The use of a belt or chain 12 trained over a pulley or sprocket 13 on the pin 91 and a corresponding rim of the housing 6 is illustrated in FIG. 4. More complex, but equally obvious linkages may be resorted to without departing from the spirit of this invention if the pivot axes of the head 5 and of the housing 6 are not parallel as they are in the illustrated embodiment of the invention.

The common center of gravity of the head 5 and of other elements of the enlarger mounted on the head is located approximately in the slot 11 and is closely adjacent the pivot axis of the head 5 on the pin 91 even if the mount 7 is shifted on the rod 73 for focusing. The head 5 therefore readily maintains any desired angular position on the pin 91. The lamp housing 6 and the lens mount 7 being spaced from the center of gravity in opposite directions, stresses in the head 5 are favorably distributed, and the head may be made of relatively light structural elements.

It should be understood, of course, that the foregoing description relates only to a preferred embodiment of the invention, and that it is intended to cover all changes and modifications of the example of the invention herein chosen for the purpose of the disclosure which do not constitute departures from the spirit and scope of the invention set forth in the appended claims.

We claim:

1. In a photographic projection apparatus having a support; a head mounted on said support for angular movement about a first pivot axis which extends horizontally in the normal operating position of the apparatus; a lens mount on said head defining an optical axis and adapted to hold an objective lens; negative holder means for supporting a transparency on said head; and a lighting system mounted on said head for passing a beam of light along said optical axis through said transparency and an objective lens held by said mount, the improvement in the lighting system which comprises:
   (a) a lamp carrier mounted on said head for rotation about a normally horizontal second pivot axis, said lamp carrier being adapted to hold a lamp;
   (b) means for deflecting the light of a lamp held by said carrier into said optical axis; and
   (c) linkage means connecting said carrier to said support for rotating the carrier on said head about said second pivot axis in response to angular movement of said head about said first pivot axis and for thereby holding said lamp carrier in a substantially fixed angular position relative to a line which is vertical in said normal operating position.

2. In an apparatus as set forth in claim 1, said pivot axes being substantially parallel.

3. In an apparatus as set forth in claim 1, said first pivot axis passing through said negative holder means.

4. In an apparatus as set forth in claim 1, said second pivot axis and said lens mount means being spaced from said first pivot axis in opposite directions.

5. In an apparatus as set forth in claim 1, said lamp carrier being offset from said optical axis in the direction of said second pivot axis.

6. In an apparatus as set forth in claim 1, said linkage means including a parallelogram linkage.

7. In an apparatus as set forth in claim 1, said linkage including pulley means on said support and said lamp carrier, and belt means trained over said pulley means.

References Cited

UNITED STATES PATENTS 2,501,469  3/1950  Kouzminsky _____ 355—67
2,989,892  6/1961  Durst _____ 355—67

NORTON ANSHER, *Primary Examiner.*

L. H. McCORMICK, JR., *Assistant Examiner.*

U.S. Cl. X.R.

355—71